C. B. PRIDEAUX.
TOOL HOLDER.
APPLICATION FILED FEB. 17, 1917.
1,308,681.
Patented July 1, 1919.
3 SHEETS—SHEET 1.
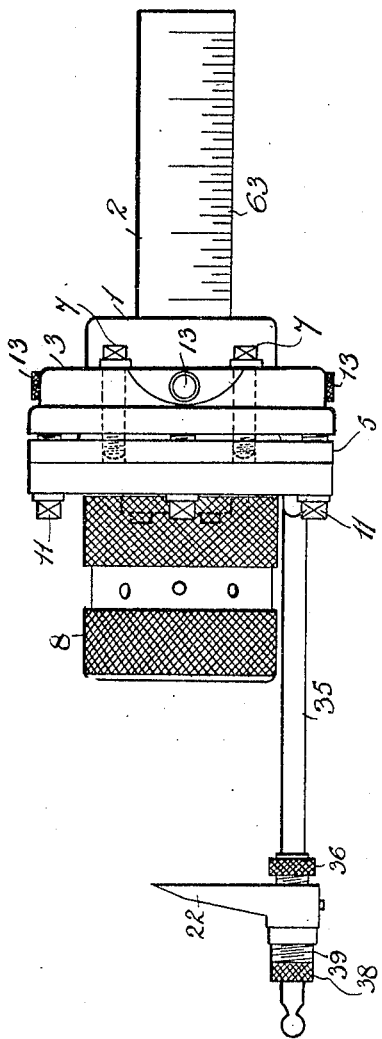
INVENTOR:-
C. B. Prideaux
By
Jno Innie
Atty.

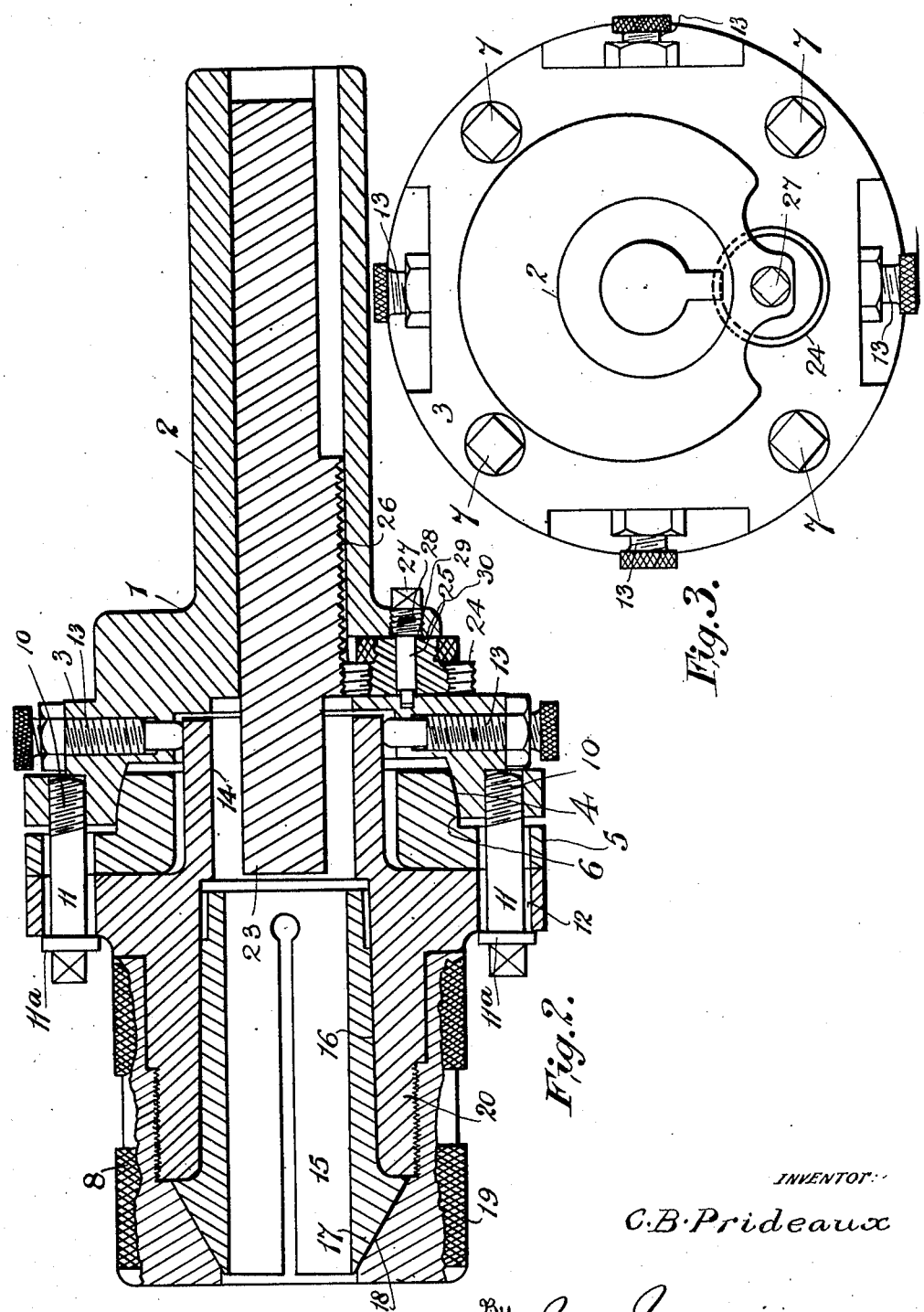

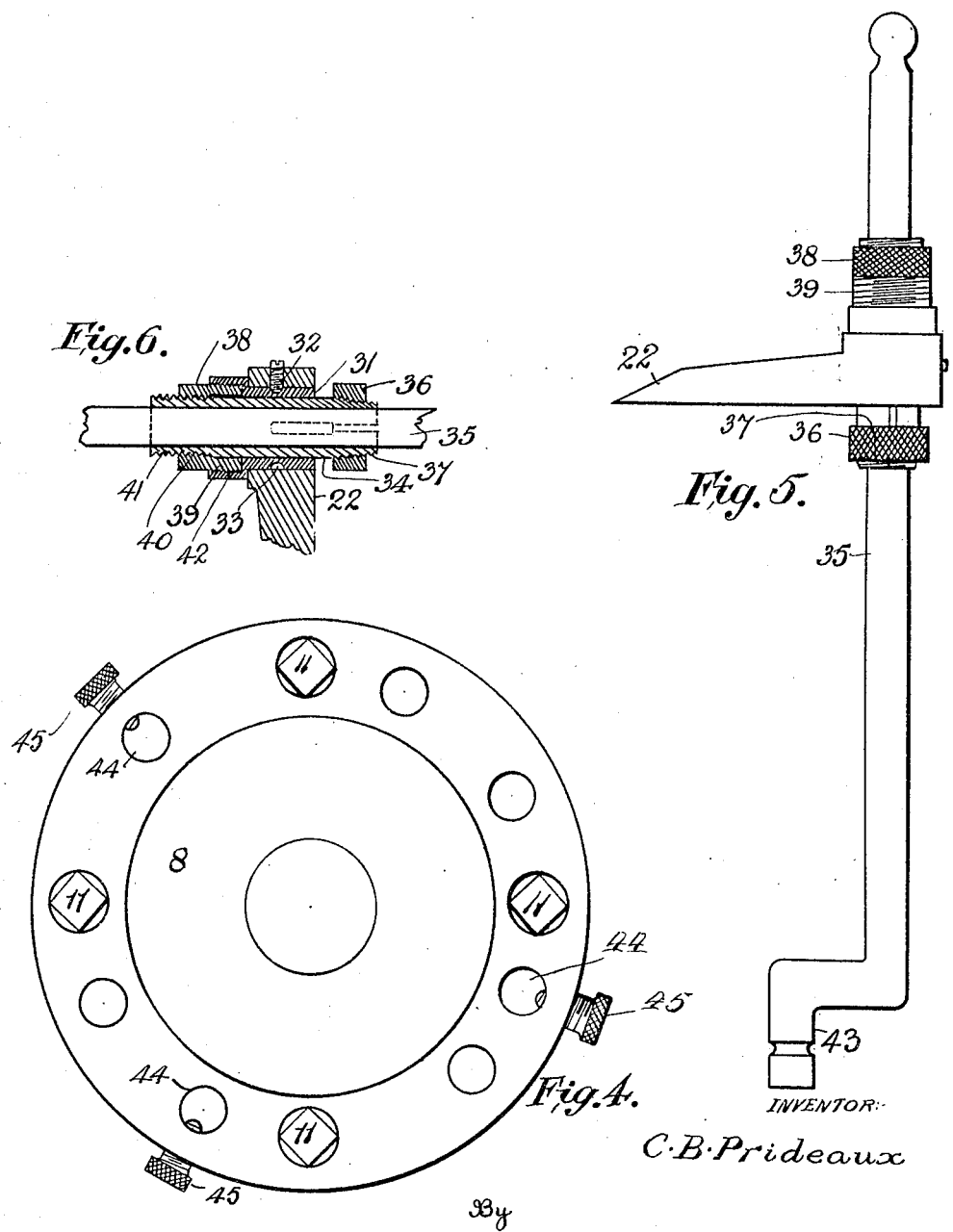

UNITED STATES PATENT OFFICE.

CLARENCE BRADSHAW PRIDEAUX, OF FOREST HILL, LONDON, ENGLAND.

TOOL-HOLDER.

1,308,681.  Specification of Letters Patent.  Patented July 1, 1919.

Application filed February 17, 1917. Serial No. 149,217.

*To all whom it may concern:*

Be it known that I, CLARENCE BRADSHAW PRIDEAUX, a subject of the King of Great Britain, residing at Forest Hill, London, England, have invented certain new and useful Improvements in Tool-Holders, of which the following is a specification.

This invention relates to tool holders for use in turret lathes or like machine tools. It has been found in practice that when accurate repetition work is required in large quantities there is a very considerable percentage of scrap due to the difficulty of properly re-setting the tools after they have been removed for grinding. This difficulty is considerably enhanced when unskilled or semi-skilled labor is used, or the machine tools are not made with extreme accuracy. To meet this difficulty skilled tool-setters are frequently employed, but unless the machine tools are very accurate, the accuracy of the setting can only be tested by trial of the tool and consequent waste of work.

The object of the present invention is to overcome the difficulties above mentioned and it consists in providing a stock with a face plate capable of being universally moved thereon so that it can be brought accurately at right angles to the lathe axis, a chuck for the tool being mounted on the face plate so that it can be moved across the same to bring the tool in alinement with the lathe axis.

The invention also comprises a tool stop adapted to be reciprocated by a fine adjusting device so as to set the tool relatively to a slide-gage adapted to be carried by the chuck, in order to re-set the tool in its proper position axially.

The invention still further comprises details hereinafter referred to.

In the accompanying drawings—

Figure 1 is a plan of one form of tool-holder according to the invention.

Fig. 2 is a sectional elevation.

Fig. 3 is a front elevation.

Fig. 4 is a rear elevation.

Fig. 5 is a view of a slide gage,

Fig. 6 being a sectional view of a detail connected therewith.

In the form of tool holder illustrated in the drawings 1 is a stock comprising a hollow shank 2 and a flanged head 3, which has a recess in its face turned with a spherical surface 4. A face plate 5 has a portion turned with a spherical surface 6 adapted to correspond with the surface 4, so that when the face-plate 5 is mounted on the head 3, the co-acting surfaces 4 and 6 form a universal joint.

The face-plate 5 is adapted to be moved about the universal joint by set screws 7 so that it may be set with its face at right angles to the axis of the lathe.

A chuck 8 which may be of any approved type well known in the art but is preferably of the collet type is mounted on the face plate 5 after the latter has been set in the proper position by the screws 7. The chuck 8 is clamped to the face plate 5 by studs 11 having screw threaded ends 10 screwed into the head 3 and having collars 11$^a$ bearing against the chuck. The holes 12 for the studs 11 are sufficiently large in diameter to permit of the chuck being moved across the face of the face plate 5 when the studs 11 are slackened. This movement is necessary in order to bring the tool in the chuck in alinement with the axis of the lathe. It is effected by radial screws 13 carried by the stock 1 and adapted to bear on a tubular extension 14 of the chuck. When the chuck has been adjusted by the screws 13, the studs 11 are tightened so that their collars 11$^a$ clamp the chuck firmly to the face plate 5. The chuck 8 is preferably provided with a split collet 15 which has a tapered shank 16 fitting in a tapered central hole in the chuck. The collet has a conical head 17 engaged by a conical surface 18 on a nut 19 screwed on to the boss 20 of the chuck, so that the collet is adapted to clamp a tool inserted in it, as is well known in the art.

When a tool, such as a drill, is to be removed for grinding, its position is first determined by a slide gage having a pointer 22 and secured to the chuck as hereinafter described. The tool is then removed, ground and re-inserted in the chuck. It is thrust in until its end engages with a tool stop 23, adapted to be adjusted in the shank 2 by suitable means; for instance a screw threaded wheel 24 freely mounted on a pin 25 engages with teeth 26 on the tool stop 23. The wheel is rotated by hand until the tool stop 23 moves forward sufficiently to force the tool or drill out into its proper position as determined by the pointer 22 of the slide gage, whereupon the pin 25 is rotated by a suitable tool applied to the squared end 27. The pin 25 is screw threaded at 28 so that when rotated it moves axially and a shoulder 29 engages with an adjacent shoulder 30 on the wheel 24 and the latter is thereby clamped firmly against the adjacent portion of the stock and prevented from rotating.

The slide gage shown comprises a pointer 22 pivotally mounted on a sleeve 31, the pointer having a pin 32 engaging within a groove 33 to prevent endwise movement on the sleeve 31 while allowing of a pivotal movement thereon. The sleeve 31 is slidably mounted on an inner sleeve 34 which is slidably mounted on a rod 35 but is adapted to be clamped thereon by a nut 36 screwed on its screw threaded end 37 which is split. The outer sleeve 31 is adapted to be slid on the inner sleeve 34 by a nut or ferrule 38 which is screw threaded internally at 40 and externally at 39 for engagement respectively with the screw threaded end 41 of the inner sleeve 34 and with the internal screw threaded portion 42 of the outer sleeve 31.

By the above described means the pointer can be roughly adjusted in position on the rod 35, the inner sleeve 31 being then clamped firmly on the rod, so that a fine adjustment of the pointer can be effected by the nut or ferrule 38.

The rod 35 has a cranked end 43 adapted to be placed in one of a number of holes 44 in the chuck and to be clamped therein by a screw 45.

The shank 2 of the stock is preferably provided with graduations 63 so that when it is inserted in the turret of the lathe as usual its position may be accurately determined. By making deeply cut graduations sufficient metal may be left to allow for a few thousandths of an inch to be ground off for fitting if necessary, and by marking a position above one of the turret holes, the holder may be set at any desired length, and may be removed and replaced in the same position.

Having set the tool holder firmly in the turret, the operator proceeds to set the face plate 5 at right angles with the axis of the lathe spindle or mandrel by means of the adjusting screws 7, the accuracy of this adjustment being tested with the aid of a dial test indicator as is well known in the art. It can be set to one thousandth part of an inch. The chuck 8 is then clamped on the face plate 5 by means of the studs 11 but not tightly until the chuck has been accurately adjusted on the face plate 5 by means of the radial adjusting screws 13, to bring the chuck or the tool therein into proper alinement with the axis of the lathe spindle or mandrel. When this is effected the studs 11 may be tightened. The tool is brought to proper position axially by moving the tool stop 23 by means of the adjusting wheel 24.

If the tool is to be removed for grinding the position of the extreme cutting edge is first determined by bringing the pointer 22 of the slide gage into accurate contact with it by the aid of the fine adjustment nut or ferrule 38. The pointer can then be swung away about the rod 35, the tool removed, ground and replaced. When the tool is replaced the tool stop 23 is again moved to force the tool up to the pointer 22 which in the meantime has been swung into position again. By this means the extreme cutting edge of the tool will be brought into the correct position.

The invention thus provides means for enabling tools on a turret lathe to be quickly and accurately reset not only lessening the work of the tool setter but avoiding the usual tests by trial by which so much scrap work is produced.

I claim:

1. A tool holder of the character referred to, comprising a stock, a face plate, a universal joint between said face plate and said stock, means for moving said face plate about said joint, comprising screws on the stock engaging with said face plate, a chuck, means for moving said chuck across the said face plate, and means for clamping said chuck to said face plate in any position in which it may be moved thereon.

2. A tool holder of the character referred to, comprising a stock, a face plate, a universal joint between said face plate and said stock, means for moving said face plate about said joint, a chuck, means for moving said chuck across the said face plate, comprising radial screws on the stock and a tubular extension on the chuck engaged by said screws, and means for clamping said chuck to said face plate in any position in which it may be moved thereon.

3. A tool holder of the character referred to, comprising a stock, a face plate, a universal joint between said face plate and said stock, means for moving said face plate about said joint, a chuck, means for moving said chuck across the said face plate, and means for clamping said chuck to said face plate in any position in which it may be moved thereon, comprising studs passing through said chuck and face plate and screwed into said stock.

4. A tool holder of the character referred to, comprising a hollow stock, a face plate mounted on said stock and adapted to be moved universally relatively thereto, a chuck, means for clamping said chuck to said face plate, a tool stop slidably mounted within said stock, and means for adjusting said stop within said stock, substantially as and for the purpose hereinbefore set forth.

5. A tool holder of the character referred to, comprising a hollow stock, a face plate mounted on said stock and adapted to be moved universally relatively thereto, a chuck, means for clamping said chuck to said face plate, a tool stop slidably mounted within said stock, means for adjusting said stop within said stock, and a slide gage and means on the chuck for holding said slide gage, substantially as and for the purpose hereinbefore set forth.

6. A tool holder of the character referred to, comprising a hollow stock, a face plate mounted on said stock and adapted to be moved universally relatively thereto, a chuck, means for clamping said chuck to said face plate, a tool stop slidably mounted within said stock, means for adjusting said stop within said stock, comprising teeth formed on the said stop and a screw threaded wheel rotatably mounted on the aforesaid stock, substantially as and for the purpose hereinbefore set forth.

7. A tool holder of the character referred to, comprising a hollow stock, a face plate mounted on said stock and adapted to be moved universally relatively thereto, a chuck, means for clamping said chuck to said face plate, a tool stop slidably mounted within said stock, means for adjusting said stop within said stock, comprising teeth formed on the said stop and a screw threaded wheel rotatably mounted on the aforesaid stock, and means for locking said wheel in its position of adjustment, substantially as hereinbefore set forth.

8. A tool holder of the character referred to, comprising a stock having a hollow cylindrical shank and a flanged head, said head having a spherical recess therein, a face plate having a projection adapted to correspond with said recess to form a universal joint and also having a central tubular extension, radial set screws on said flanged head for engagement with said tubular extension, a chuck, means for clamping said chuck to said face plate, said chuck having a split collet to receive a tool, and clamping means for said collet, substantially as hereinbefore set forth.

9. In combination a tool holder comprising a stock, a face plate adapted to be moved universally relatively thereto, a chuck, means for clamping said chuck on said face plate, a tool stop slidably mounted within said stock, a slide gage comprising a rod, an inner sleeve slidably mounted on said rod, means for clamping said inner sleeve on said rod, an outer sleeve on the aforesaid sleeve, a pointer pivotally mounted on said outer sleeve, and means for finely adjusting the outer sleeve on the inner sleeve, and means on the aforesaid chuck for holding said rod, substantially as and for the purpose hereinbefore set forth.

10. In combination a tool holder comprising a stock, a face plate, a universal joint between said face plate and stock, a chuck, adjustable means for clamping said chuck on said face plate, a tool stop within said stock, a slide gage carried by the chuck, and means for adjusting said tool stop relatively to said gage, substantially as and for the purpose hereinbefore set forth.

11. A tool holder of the character described, comprising a stock, a face plate connected therewith and adapted to be angularly adjusted with relation thereto and having a main opening, a chuck carried by the face plate and having a longitudinal extension projecting into the main opening, means carried by the stock and engaging the extension to shift it laterally with relation to the face plate, and a tool stop longitudinally adjustably mounted within the stock.

12. A tool holder of the character described, comprising a stock, a face plate connected therewith and adapted to be angularly adjusted with relation thereto and having a main opening, a chuck carried by the face plate and having a longitudinal extension projecting into the main opening, means carried by the stock and engaging the extension to shift it laterally with relation to the face plate, a tool stop longitudinally adjustably mounted within the stop, and an adjustable gage connected with the chuck and arranged near one end thereof.

13. A tool holder of the character described, comprising a stock, a face plate connected therewith and adapted to be angularly adjusted with relation thereto and having a main opening, a chuck arranged upon the outer side of the face plate and having a tubular extension projecting into the main opening, radial bolts associated with the stock and contacting with the tubular extension to shift the chuck transversely of the face plate, and means to clamp the chuck in adjustment at a desired position upon the face plate.

In testimony whereof I have signed my name to this specification in the presence of two subscribing witnesses.

CLARENCE BRADSHAW PRIDEAUX.

Witnesses:
  A. W. MATHYS,
  H. MATHYS.

Copies of this patent may be obtained for five cents each, by addressing the "Commissioner of Patents, Washington, D. C."